(12) United States Patent
Göransson

(10) Patent No.: US 6,905,393 B2
(45) Date of Patent: Jun. 14, 2005

(54) METHOD FOR SIMULTANEOUS MACHINING AND MEASURING PARAMETERS OF A SURFACE BEING SUBJECTED TO MACHINING

(75) Inventor: Bo Göransson, Göteborg (SE)

(73) Assignee: Aktiebolaget SKF, Gothenburg (SE)

( * ) Notice: Subject to any disclaimer, the term of this patent is extended or adjusted under 35 U.S.C. 154(b) by 60 days.

(21) Appl. No.: 10/678,079

(22) Filed: Oct. 6, 2003

(65) Prior Publication Data

US 2004/0133299 A1 Jul. 8, 2004

(30) Foreign Application Priority Data

Oct. 7, 2002 (SE) .............................................. 0202965

(51) Int. Cl.[7] .............................................. B24B 49/00
(52) U.S. Cl. ................ 451/5; 451/9; 451/11; 451/61
(58) Field of Search ........................ 451/5, 8–11, 51, 451/61

(56) References Cited

U.S. PATENT DOCUMENTS

| | | | | | |
|---|---|---|---|---|---|
| 4,704,825 | A | * | 11/1987 | Moore | 451/5 |
| 5,782,674 | A | * | 7/1998 | Hahn | 451/9 |
| 6,592,430 | B1 | * | 7/2003 | Nakasuji et al. | 451/9 |
| 6,616,508 | B1 | * | 9/2003 | Kamamura et al. | 451/8 |
| 6,845,340 | B2 | * | 1/2005 | Edie et al. | 702/179 |

FOREIGN PATENT DOCUMENTS

DE 100 29 965 A1 1/2002

* cited by examiner

Primary Examiner—Hadi Shakeri
(74) Attorney, Agent, or Firm—Burns, Doane, Swecker & Mathis, L.L.P.

(57) ABSTRACT

A method for establishing different parameters of a surface of a work piece during machining of the surface using a spindle supporting a tool and displacement sensors for measuring displacement to which the spindle is subjected during machining. The method involves machining work pieces with different back off times to create sets of sensor signals representing spindle deflections. The machined work pieces are measured and then the stored sensor signals are compared with the measurement results of the same work pieces. Transfer constants are calculated representing the influence of the total deflection of the machine stiffness on the sensor signals. Displacement sensor signals obtained upon machining subsequent work pieces are processed with the transfer constants to give a series of sensor signals representing the true total deflection of the loaded and running machine stiffness chain to permit calculation of different parameters of the subsequently machined work pieces.

14 Claims, 1 Drawing Sheet

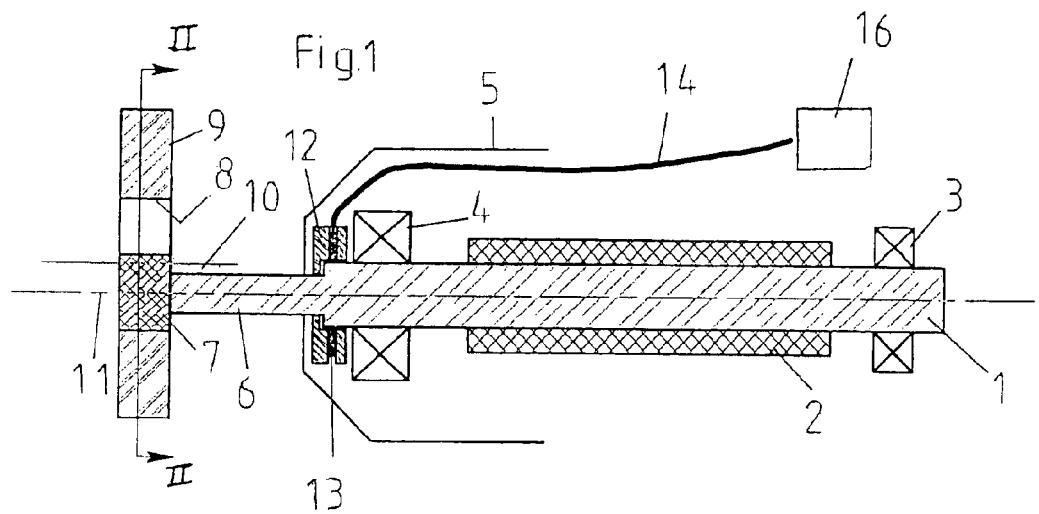
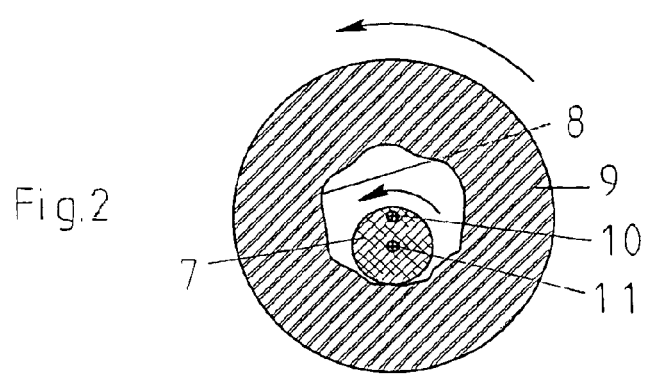
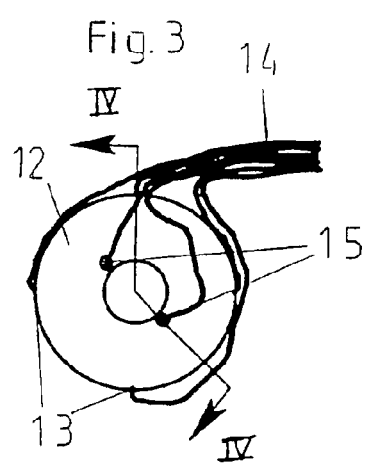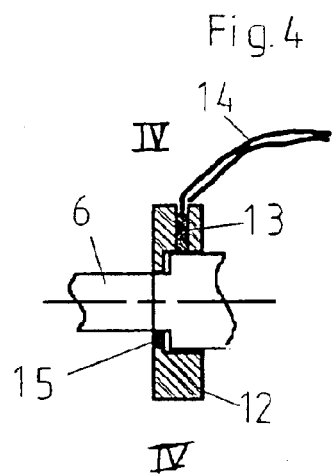

METHOD FOR SIMULTANEOUS MACHINING AND MEASURING PARAMETERS OF A SURFACE BEING SUBJECTED TO MACHINING

This application is based on and claims priority under 35 U.S.C. § 119 with respect to Swedish Application No. 0202965-0 filed on Oct. 7, 2002, the entire content of which is incorporated herein by reference.

FIELD OF THE INVENTION

The present invention generally relates to the machining of a surface and the measurement of parameters of a surface being machined. More particularly, the invention pertains to a method for facilitating simultaneous machining and measuring of parameters of a surface of a bore in a work piece subjected to a grinding operation.

BACKGROUND DISCUSSION

During the machining of bores in work pieces or other surfaces of different kinds, to obtain good results the bore should be measured for continuously establishing parameters such as bore diameter, taper and roundness. In the past this has been mainly accomplished with different types of gauges. This requires that the measurement must be made between grinding operations which of course increases the total process time to at least some extent. In mass-production, this is quite unacceptable.

To improve the process, and permit the measurement of bore diameter and taper, measurement fingers have been used which enter in the bore when the grinding wheel is removed. However, even in this case the measurement is made between the grinding operations which thus means relatively long grinding cycles. Also, the measurement fingers are not useful for roundness measurement and their use necessitates extra equipment for the machine, which is susceptible to damage when the measurement fingers are moved to and from measuring position. Furthermore this known kind of measuring mechanism has a relatively low resolution.

DE-A1-100 29 965 refers to a method and a device for contact-free load measurement of a rotating spindle for the purpose of tool supervision. The device incorporates at least one displacement sensor which measures position changes of the rotatable spindle in relation to the housing, caused by axial forces, radial forces or torques acting on a tool supported by the spindle. The resulting measurement signal curve for one revolution of the spindle without a load applied to the tool is thus representative for irregularities and out-off-roundness of the measured surface of the rotating spindle. The measurement signal curve is stored in an evaluation unit then is subtracted from the measurement signal curve for one revolution of the spindle with tool and spindle load in order to compensate for the part of the measurement signal curve caused by irregularities and out-off-roundness of the spindle itself. The evaluation unit emits an output representative only of the spindle and tool load. By repeated tests and with the aid of a rotational angle sensor, it is possible to obtain from the evaluation unit a curve representing the pure tool load without influence from spindle irregularities or out-off-roundness and without spindle load.

SUMMARY OF THE INVENTION

Generally speaking, a method is disclosed which makes possible a simultaneous machining and measurement of parameters of a machined surface of a work piece, such as bore diameter, taper and roundness of a bore during internal machining, such as by grinding.

One aspect of the invention involves a method for establishing different parameters of a surface of a work piece during machining of the surface using a machine with a spindle supporting a tool, with the spindle rotatably supported in at least one bearing in a housing, and with displacement sensor means arranged for measuring displacement to which the spindle is subjected during machining operation. The method comprises machining two first work pieces with different back off times to create two sets of sensor signals with different level at back off times, storing in an evaluation unit the sensor signals which represent displacement to which the spindle was subjected during the machining of the two first work pieces, measuring the two machined first work pieces to obtain measurement results which are loaded in the evaluation unit, comparing in the evaluation unit the stored sensor signals representing the displacement to which the spindle was subjected during the machining of the two first work pieces with the measurement results of the two machined first work pieces, and calculating transfer constants representing an influence of total deflection of machine stiffness on the sensor signals, and recording a difference in feeding positions between the two first work pieces, whereby displacement sensor signals obtained at machining of subsequent work pieces are fed into the evaluation unit and are processed with the transfer constants to give a series of sensor signals representing a true total deflection of a loaded and running machine stiffness chain. The sensor signals representing the true total deflection are subsequently used to calculate different parameters of the subsequently machined work pieces.

Another aspect of the invention involves a method for establishing different parameters of a surface of a work piece during machining of the surface using a machine with a spindle supporting a tool, with the spindle rotatably supported in at least one bearing in a housing, and with displacement sensor means arranged in the housing for measuring displacement to which the spindle is subjected during machining operation. The method comprises machining a first work piece and stopping the machining early when there exists an out-of roundness, measuring the first work piece, storing in an evaluation unit sensor signals representing deflections of the spindle obtained from a combination of a recorded signal for a last revolution before back off plotted against a rotational angle of the work piece and the measured work piece, comparing in the evaluation unit the stored sensor signals representing a displacement to which the spindle was subjected during the machining of the first work piece with a result from the measurement of the first work piece, and calculating a transfer constant representing influence of a total deflection of the machine stiffness on the sensor signals. The method also comprises recording a feeding position for the first work piece, with displacement sensor signals obtained upon machining subsequent work pieces being fed into the evaluation unit and being processed with the transfer constant to give a series of sensor signals representing a true total deflection of a loaded and running machine stiffness chain, and subsequently using the true total deflection signals for calculating different parameters of subsequently machined work pieces.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements.

FIG. 1 is a schematic cross-sectional side view of a grinding spindle during simultaneous grinding and measuring in accordance with the present invention.

FIG. 2 is a cross-sectional end view along the section line 11—11 in FIG. 1.

FIG. 3 is an end view of a retainer carrying a number of sensors incorporated in the device shown in FIG. 1.

FIG. 4 is a cross-sectional view taken along the section line IV—IV in FIG. 3.

DETAILED DESCRIPTION

Referring to FIG. 1, a machine spindle 1 is rotatably driven by a drive means which, according to one embodiment, is in the form of an electrical motor 2. The machine spindle 1 is rotatably supported in a first bearing 3 and a second bearing 4. The bearings 3, 4 and the drive means (motor) 2 are enclosed in a housing 5, through an opening in which the machine spindle projects. A tool 7 is secured to the projecting free end 6 of he spindle 1. In the illustrated embodiment, the tool 7 is in the form of a grinding wheel which is in machining contact with a bore 8 in an annular work piece 9, which in turn is rotatably driven by a driving motor via a chucking arrangement. There is an offset O between the rotational axis 10 of the work piece 9 and the rotational axis 11 for the spindle 1, 6. The work piece can also be rotated according to the microcentric principle.

At a position adjacent the bearing 4 that is situated nearest to the tool 7, and within the housing 5, there is provided a retainer 12 for at least one displacement sensor 13. The displacement sensor 13 is connected to an evaluation unit 16 via a cable 14.

FIG. 2 shows the work piece 9 with its bore 8, which in the drawing is shown with exaggerated irregularities and out-off-roundness. As can be seen, the surface of the tool or grinding wheel 7 is in machining contact with the inner surface of the bore 8 in the work piece 9, with the axis 10 of the work piece and the axis 11 of the tool being offset from each other.

FIG. 3 illustrates the retainer 12 with displacement sensor means. In the disclosed embodiment, the displacement sensor means include four sensors 13 arranged to detect displacement of the spindle in radial directions, and also two sensors 15 arranged to detect displacement of the spindle in the axial direction. The number and type of sensors is not critical, although it is preferable that sensors of the same type are evenly spaced apart from each other. The sensors are preferably of the non-contacting type. It is also preferable, though not necessary, to couple all sensors differentially for compensating for temperature differences, drift, and electrical and magnetic disturbances. All of the sensors 13, 15 are connected via the cable 14 to the evaluation unit 16.

FIG. 4 shows the positioning of the different sensors in the retainer 12, including the sensors for radial displacement measurement, sensors 13, and the sensors for axial displacement measurement, sensors 15.

The embodiment disclosed here makes it possible to establish in real time simultaneously with the machining operation, a variety of parameters of the object being machined, including the diameter, roundness and taper, without the need for providing any measuring equipment, either at or in the work piece. This is obtained with the high resolution displacement sensors 13, 15 integrated in the spindle, whereby the deflection of the shaft can be measured during the grinding operation. By establishing the transfer functions of deflection, position and angle from the grinding wheel contact relative the work piece contact to the measured displacement signals it is possible to calculate the position and the deflection angle of the grinding wheel relative to the work piece. These transfer functions depend on the bending of the shaft and quill and on the deformation of the bearing plus deformation in the machine, workhead, spindle, slides, etc. The parameters in the transfer functions can be calculated and/or calibrated for the system. The function is often purely linear for the small deformations occurring at the end of the grinding cycle. The relation between measured displacement signals and grinding force can also be estimated by calculations and/or testing. That information can be used for optimizing feeding speeds and to see how well the wheel instantly is cutting. By plotting the true deflection and the workhead spindle runout against the rotational angle of the work piece a diagram of the roundness of the bore can be produced in real time. The work speed can be measured either directly on the workhead spindle, for example by way of a tachometer, or indirectly by way of a frequency analysis of the sensor signals. The diameter of the bore is calculated from the true deflection and the feeding position of the spindle. The taper is found from the deflection angle of the wheel. By measuring in two directions, the cutting forces in relation to feeding forces can be obtained. With high resolution sensors the end of air feeding can be detected. Here the displacement sensors can replace other systems such as acoustic sensor systems.

The method for establishing different parameters of a surface of the work piece 9 during machining of the surface using a machine with a spindle 1, 6 supporting a tool 7, which spindle is supported in at least one bearing 4 in a housing 5 in a rotary manner, and with displacement sensor means 13, 15 arranged in the housing for measuring displacement to which the spindle is subjected during machining operation, involves machining two first work pieces 9 with different back off times to create two sets of signals with different level at back off times. The sensor signals representing the deflection of the spindle are stored in an evaluation unit 16. The two work pieces thus machined are measured and the result of this measurements is loaded in the evaluation unit. The stored sensor signals representing the displacement to which the spindle was subjected during the machining of the two work pieces are compared in the evaluation unit 16 with the result from the measurement of the same work pieces, and constants are calculated, which constants are transfer constants, representing the influence of the total deflection of the machine stiffness chain (from machine contact, over spindle, machine and work piece back to machine contact) on the sensor signals, whereby displacement sensor signals obtained at machining of subsequent work pieces 9 are fed into the evaluation unit and there are processed with the constants for giving a series of sensor signals representing the true total deflection of the loaded and running machine stiffness chain. Subsequently this true total deflection signals are used for calculating different parameters of the subsequently machined work pieces.

The true total deflection constants can also be calculated from one work piece where the machining has stopped early and there is still a large unroundness. The combination of the recorded signal for the last revolutions before back off plotted against rotational angle of the work piece and the measured work piece gives the transfer functions.

Based on the true total deflection signals and the recorded feeding position, it is possible to calculate from these two values the machined bore diameter, with the first machined work pieces as a reference.

By measuring or calculating the rotation angle of the work piece, it is possible to produce a real time diagram of the roundness of the work piece simultaneously subjected to machining, by plotting the true total deflection against the rotation angle of the work piece.

Instead of measuring displacement on the grinding spindle, the sensors can be applied to the workhead spindle or to reference surfaces of the work piece and the same parameters can be calculated.

The rotational angle of the work piece 9 can be measured by means of an angular position detector, such as a tachometer on the workhead spindle or on the work piece, or it can be calculated by signal processing for establishing the period in which the sensor signal repeats itself.

For bores where the length of the bore and grinding wheel are similar, the taper of the bore is calculated directly from the transfer function for the deflection angle and the sensor signal.

By feeding the tool 7 axially and performing the measurement for establishing bore diameter in two positions axially spaced apart from each other, it is possible to determine the taper of the machined surface, also for longer bores.

The sensor retainer is all enclosed in the spindle housing 5 and in spite of the hard environment for the measurement, the sensors are all protected by the housing and the seals thereof.

Using a method such as that described it is possible to obtain in real time simultaneously with the machining operation clear illustrations (preferably in diagram form) of the instant parameters for the work piece. It is therefore possible to consider during the very machining operation the tolerances and quality of the work piece thus machined. It is also possible to detect the cutting forces and thereupon optimize the dressing intervals for a grinding wheel.

The principles, preferred embodiment and mode of operation of the present invention have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A method for establishing different parameters of a surface of a work piece during machining of the surface using a machine with a spindle supporting a tool, with the spindle rotatably supported in at least one bearing in a housing, and with displacement sensor means arranged for measuring displacement to which the spindle is subjected during machining operation, the method comprising:

machining two first work pieces with different back off times to create two sets of sensor signals with different level at back off times;

storing in an evaluation unit the sensor signals which represent displacement to which the spindle was subjected during the machining of the two first work pieces;

measuring the two machined first work pieces to obtain measurement results which are loaded in the evaluation unit;

comparing in the evaluation unit the stored sensor signals representing the displacement to which the spindle was subjected during the machining of the two first work pieces with the measurement results of the two machined first work pieces, and calculating transfer constants representing an influence of total deflection of machine stiffness on the sensor signals;

recording a difference in feeding positions between the two first work pieces, whereby displacement sensor signals obtained at machining of subsequent work pieces are fed into the evaluation unit and are processed with the transfer constants to give a series of sensor signals representing a true total deflection of a loaded and running machine stiffness chain; and subsequently using the sensor signals representing the true total deflection to calculate different parameters of the subsequently machined work pieces.

2. A method as claimed in claim 1, further comprising calculating a machined bore diameter from the recorded feeding positions and the true total deflection signals, with the two machined first work pieces as a reference.

3. A method as claimed in claim 2, measuring or calculating a rotation angle of the two first work pieces, and producing a real time diagram of a roundness of the first work pieces simultaneously subjected to machining, by plotting the true total deflection against the rotation angle of the first work pieces.

4. A method as claimed in claim 3, wherein the rotational angle of the first work pieces is calculated or measured by an angular position detector.

5. A method as claimed in claim 1, further comprising calculating a rotational angle of a workhead spindle by signal processing to establish a period in which the sensor signal repeats itself.

6. A method as claimed in claim 1, further comprising feeding the tool axially and measuring a bore diameter of the first work pieces in two positions axially spaced apart from each other to determine a taper of the machined surface.

7. A method as claimed in claim 1, wherein the surface being machined is a bore having a length that is the same as the length of the grinding wheel, and further comprising calculating a taper of the bore directly from the transfer constant for a deflection angle to the sensor signal.

8. A method for establishing different parameters of a surface of a work piece during machining of the surface using a machine with a spindle supporting a tool, with the spindle rotatably supported in at least one bearing in a housing, and with displacement sensor means arranged in the housing for measuring displacement to which the spindle is subjected during machining operation, the method comprising:

machining a first work piece and stopping the machining early when there exists an out-of roundness;

measuring the first work piece;

storing in an evaluation unit sensor signals representing deflections of the spindle obtained from a combination of a recorded signal for a last revolution before back off plotted against a rotational angle of the work piece and the measured work piece;

comparing in the evaluation unit the stored sensor signals representing a displacement to which the spindle was subjected during the machining of the first work piece with a result from the measurement of the first work piece;

calculating a transfer constant representing influence of a total deflection of the machine stiffness on the sensor signals;

recording a feeding position for the first work piece, with displacement sensor signals obtained upon machining subsequent work pieces being fed into the evaluation unit and being processed with the transfer constant to give a series of sensor signals representing a true total deflection of a loaded and running machine stiffness chain; and subsequently using the true total deflection signals for calculating different parameters of subsequently machined work pieces.

9. A method as claimed in claim 8, further comprising calculating a machined bore diameter from the recorded feeding position and the true total deflection signals, with the first machined work piece as reference.

10. A method as claimed in claim 9, further comprising measuring or calculating a rotation angle of the first work piece, and producing a real time diagram of a roundness of the first work piece simultaneously subjected to machining, by plotting the true total deflection against the rotation angle of the first work piece.

11. A method as claimed in claim 9, wherein the rotational angle of the first work piece is calculated or measured by an angular position detector.

12. A method as claimed in claim 8, further comprising calculating a rotational angle of a workhead spindle by signal processing to establish a period in which the sensor signal repeats itself.

13. A method as claimed in claim 8, further comprising feeding the tool axially and measuring a bore diameter of the first work piece in two positions axially spaced apart from each other to determine a taper of the machined surface.

14. A method as claimed in claim 8, wherein the surface being machined is a bore having a length that is the same as the length of the grinding wheel, and further comprising calculating a taper of the bore directly from the transfer constant for a deflection angle to the sensor signal.

* * * * *